(12) United States Patent
Etter (10) Patent No.: US 9,486,106 B2
(45) Date of Patent: Nov. 8, 2016

(54) DEVICE AND METHOD FOR RETRIEVING A CAPSULE FROM A BEVERAGE PRODUCTION APPARATUS

(75) Inventor: Stefan Etter, Kehrsatz (CH)

(73) Assignee: Nestec S.A., Vevey (CH)

( * ) Notice: Subject to any disclaimer, the term of this patent is extended or adjusted under 35 U.S.C. 154(b) by 738 days.

(21) Appl. No.: 13/876,344

(22) PCT Filed: Aug. 19, 2011

(86) PCT No.: PCT/EP2011/064300
§ 371 (c)(1),
(2), (4) Date: Mar. 27, 2013

(87) PCT Pub. No.: WO2012/041605
PCT Pub. Date: Apr. 5, 2012

(65) Prior Publication Data
US 2013/0183130 A1    Jul. 18, 2013

(30) Foreign Application Priority Data

Sep. 28, 2010  (EP) ..................................... 10180617
May 27, 2011  (EP) ..................................... 11167862

(51) Int. Cl.
*A47J 31/44*     (2006.01)
*A47J 31/36*     (2006.01)

(52) U.S. Cl.
CPC .............. *A47J 31/44* (2013.01); *A47J 31/3638* (2013.01); *A47J 31/3676* (2013.01); *A47J 31/4471* (2013.01)

(58) Field of Classification Search
CPC .. A47J 31/3638; A47J 31/3676; A47J 31/44; A47J 31/4471
USPC ..................................... 99/295; 414/738–741
See application file for complete search history.

(56) References Cited

U.S. PATENT DOCUMENTS 3,470,812 A * 10/1969 Levinson .............. A47J 31/005
                                                         99/295
5,794,519 A *  8/1998 Fischer ............... A47J 31/0678
                                                         99/295

(Continued)

FOREIGN PATENT DOCUMENTS

EP         1669011      6/2006
WO    WO2009113035      9/2009

OTHER PUBLICATIONS

Office Action in JP application P2013-529592. Mailed Aug. 18, 2015. 8 pages.

*Primary Examiner* — David Angwin
*Assistant Examiner* — John J Norton
(74) *Attorney, Agent, or Firm* — K&L Gates LLP (57) ABSTRACT

The invention aims to provide a device and a method for retrieving efficiently a capsule from a receptacle of a beverage production apparatus. In particular, the device allows retrieving a used capsule in safe conditions and without waiting time. The beverage production apparatus comprises a receptacle (1) with a cover (3) for receiving a capsule (2) containing beverage ingredient. The device comprises capsule extracting and guiding means consisting of a clamp (6) having members (6', 6") arranged on each lateral side of the cover (3) of the receptacle. The capsule (2) is provided with a rim (8) around its upper edge which is directed upwards when the capsule is inserted in the receptacle (1). At opening of the cover of the receptacle, the clamp (6) is activated in such a way to position its members under the rim (8) of the capsule which is lifted thanks to a spring (4) at the bottom of the capsule.

14 Claims, 5 Drawing Sheets

(56) References Cited

U.S. PATENT DOCUMENTS

| | | | |
|---|---|---|---|
| 6,079,315 A | 6/2000 | Beaulieu et al. | |
| 6,139,244 A * | 10/2000 | VanRaden | B65F 3/041 |
| | | | 414/408 |
| 2002/0148356 A1 * | 10/2002 | Lazaris | A47J 31/0668 |
| | | | 99/295 |
| 2005/0126399 A1 * | 6/2005 | Bragg | A47J 31/0673 |
| | | | 99/279 |
| 2006/0123998 A1 * | 6/2006 | Castellani | A47J 31/0673 |
| | | | 99/495 |
| 2007/0068394 A1 * | 3/2007 | Jarisch | A47J 31/3638 |
| | | | 99/279 |
| 2009/0007794 A1 * | 1/2009 | Cortese | A47J 31/3628 |
| | | | 99/289 R |
| 2009/0117249 A1 * | 5/2009 | Ozanne | A47J 31/3628 |
| | | | 426/590 |
| 2010/0011965 A1 * | 1/2010 | Turi | A47J 31/369 |
| | | | 99/289 R |
| 2011/0000377 A1 * | 1/2011 | Favre | A47J 31/3628 |
| | | | 99/289 R |
| 2011/0100229 A1 * | 5/2011 | Rivera | A47J 31/057 |
| | | | 99/287 |
| 2012/0207893 A1 * | 8/2012 | Kruger | A47J 31/3633 |
| | | | 426/431 |
| 2013/0092031 A1 * | 4/2013 | Magno | A47J 31/3633 |
| | | | 99/297 |

* cited by examiner

DEVICE AND METHOD FOR RETRIEVING A CAPSULE FROM A BEVERAGE PRODUCTION APPARATUS

CROSS REFERENCE TO RELATED APPLICATIONS

The present application is a National Stage of International Application No. PCT/EP2011/064300, filed on Aug. 19, 2011, which claims priority to European Patent Application No. 10180617.2, filed Sep. 28, 2010 and European Patent Application No. 11167862.9, filed May 27, 2011, the entire contents of which are being incorporated herein by reference.

FIELD OF THE INVENTION

The invention relates to a device and a method for retrieving a capsule containing beverage ingredient from a brewing unit of a beverage production apparatus.

TECHNICAL BACKGROUND

The preparation of a beverage by a capsule containing beverage ingredient is known. In general, the capsule is inserted in a beverage production device, such as a coffee machine, liquid is fed in the capsule and a beverage is extracted from the capsule under pressure or by gravity.

The preparation of a beverage by using the centrifugation is known. The principle mainly consists in providing a beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

The term "capsule" refers to any flexible, rigid or semi-rigid container containing beverage ingredient. Other synonymous to a capsule are: "pod", "pad", "cartridge" or "sachet". The capsule can be single use. The container can also be filled with ingredient by the user to form the capsule just before use.

The term "ingredient" means any suitable beverage substance such as ground coffee, soluble coffee, leaf tea, soluble tea, herbal tea, dairy powder, culinary powder, baby food and combination thereof.

After preparation of the beverage, the used capsule is generally removed by hand from the receptacle of the apparatus after opening a cover closing the receptacle during the beverage production. This operation may be dangerous in case of hot beverages preparation where the capsule remains hot after brewing. To solve this safety problem, the cover remains closed until the capsule is cooled down. This quite long cooling period presents a drawback when several beverages have to be produced in a short time.

There are beverage apparatuses in which the capsule is guided during its insertion in an opened brewing unit along substantially vertical sliders and retained in an intermediate position by lateral retaining means such as fixed or retractable or pivotal elements as described in WO2005/004683. When the brewing unit is closed, the capsule is forced to move from its intermediate position to its extraction position. The ejection of the capsule is obtained when the brewing unit is re-opened because the capsule is no longer retained by the retaining element and falls by gravity. However, such system is not appropriate for a receptacle holding a capsule substantially horizontally or with a low angle relative to horizontal.

In some other apparatus configurations, the receptacle tilts according to an angle defined so that the used capsule falls directly into a container when beverage production is terminated and the cover of the receptacle opened.

For example, international patent publication WO2009/113035 relates to a beverage preparation apparatus comprising an opening and closing mechanism to open and close the capsule holder relative to the extraction head wherein the apparatus comprises an ejection mechanism of the capsule comprising a pusher configured for leveraging the capsule by engaging with the capsule flange when the extraction head is opened in an upward position.

However, for a correct ejection of the capsule, the system must fulfill certain design's constraints. In particular, it requires that the device is sufficiently inclined and that the pusher is sufficiently long and is curved for dislodging the capsule from the capsule holder.

In another alternative solution of WO2009/113035, the capsule receiver is hinged to be able to rotate and place the capsule on a curved fixed rail assembly for ejection. However, in order for the capsule to be properly ejected, an acceleration of the receiver is necessary when rotated. Therefore, the success of the ejection is highly dependent on the opening speed of the device. Furthermore, such construction is very cumbersome.

Document GB2449420B discloses a capsule ejection system based on a clamping mechanism integrated in a head of a beverage production apparatus. At ejection, a used capsule is seized by a clamp and the head carrying thus the capsule moves horizontally rearwards to an ejection position where the capsule is released by the clamp and falls by gravity into a space behind the head.

Such a system for seizing and transporting a capsule from a brewing position to an ejection position involves a very complex and failure sensitive mechanism which construction, production and maintenance may present costs effectiveness problems.

EP1669011 refers to a delivery head for espresso coffee machine comprising a top supporting element pivoted to a bottom supporting element. Ejecting means are provided which include a capsule ejecting fork pivoted to a pivot pin applied to the bottom supporting element and an annular portion designed for encompassing the top of the capsule which is suitable provided with a rim. As the top supporting element is raised, the fork element is raised too owing to the provision of tooth elements formed on the fork element and cooperating with respective slanted planes or surfaces of the top supporting element which operate as a linear cam. The fork element lifts the capsule and upon achieving a set inclination, the capsule slides on the fork element and falls into a collecting vessel. Then, when the mentioned inclination is exceeded, the tooth element of the fork disengaged from the slanted surfaces of the top supporting element. Accordingly the fork element returns to its starting position in which is abuts against the bottom supporting element. The requirement of tooth elements with the fork to provide such a disengaging operation at a given inclination is prone to wearing and/or blocking issues.

SUMMARY OF THE INVENTION

The object of the invention is to provide a simple and efficient device for retrieving a capsule from a receptacle of a beverage production apparatus. In particular, an advantage is to allow retrieving a used capsule in a convenient manner while reducing the user's intervention. Another advantage is to offer safer retrieving conditions of the capsule without injuries on users of the apparatus due to high temperatures and without waiting the cooling down of the capsule before opening the receptacle. Another object is to provide a device particularly well adapted for centrifugation although it can be used for brewing devices using other brewing principles.

These objects are achieved by a device for retrieving a capsule in a beverage production apparatus comprising a housing, a cover and a receptacle for receiving said capsule containing a beverage ingredient, the cover and/or the receptacle being moveable between a receptacle closed position and a receptacle opened position, the device is characterized in that it comprises:

- at least one extracting means for extracting and seizing the capsule when inserted in the receptacle, said extracting means being configured to be activated at opening of said receptacle,
- at least one guiding means coupled to the extracting means and configured to be activated after extraction of the capsule and to guide the capsule in gliding on a slope, said slope being defined by an angular position of the cover relative to a horizontal plane.

The device generally applies to substantially horizontally positioned receptacles as for example in the beverage preparation system as described in WO2010/026053. In fact, the receptacle being configured for rotating the capsule during brewing operation, it cannot be easily tilted for extracting a used capsule. Therefore a mechanism coupled to the cover of the receptacle and adapted for extracting and gliding the extracted capsule towards a collection space becomes an advantageous and safer alternative to the hand extracting method.

It has to be noted that a similar mechanism may also be applied to beverage production apparatuses without centrifugation and/or with a receptacle not necessarily horizontally positioned.

It has also to be noted that the invention extends to a moving cover and a fixed receptacle or a fixed cover and a moving receptacle or both a moving cover and moving receptacle. All three alternatives are possible and the term "relative" in relation to the parts (cover/receptacle) is used on purpose to cover all of these alternatives in the broadest sense.

The cover is preferably moveable relative to the receptacle in the opened position to ensure that the slope defined by the guiding means forms an angle A which differs from the horizontal plane. Most preferably, the angle A also differs from the vertical plane to ensure a smooth retrieving of the capsule from the device. Preferably, the angle A relative to horizontal is comprised between 5 and 90 degrees, most preferably between 10 and 75 degrees.

The capsule is preferably guided on a slope towards a capsule collection space such as a bin or the like. For space-saving reasons, the capsule collection space may as well be a space outside the beverage production apparatus.

In a preferred configuration, the cover is hinged to a part of the apparatus housing in such a way to tilt relative to the receptacle in moving from the closed to the opened position. In alternative, the cover can be fixed and the receptacle be hinged to a part of the apparatus housing in such a way to tilt relative to the fixed cover in moving from the closed to the opened position.

In a possible solution, the cover is hinged along an axis which is perpendicular to an extension arm of the cover connecting to the hinge. In an alternative, the cover is hinged along an axis which is longitudinal to the extension arm of the cover connecting to the hinge. In still another alternative, the cover is hinged in an articulated manner along both a perpendicular and longitudinal axis to the extension arm. In all these solutions, the cover is moved relatively away from the receptacle and takes an angular position enabling gliding of the capsule along the slope defined by the position of the cover relative to the receptacle.

According to a preferred configuration the extracting and guiding means comprise a clamp configured to seize the capsule by engaging under a rim arranged around an upper edge of the capsule.

The guiding means is preferably formed by the clamp for guiding the capsule along the slope.

The clamp has opposite members arranged, preferably symmetrically, on each lateral side of the cover.

The opposite members are preferably joined to the cover in a manner that allows the opposite member to be moved or spread under the force of a spring.

According to a preferred configuration the extracting and guiding means comprise a clamp having opposite members arranged symmetrically on each lateral side of the cover. The capsule is provided with a rim around its upper edge which is directed upwards when the capsule is inserted in the receptacle. At opening of the cover of the receptacle, the clamp is activated in such a way to position its members under the rim of the capsule which is lifted thanks to a spring at the bottom of the capsule. The two opposite members of the clamp arranged on either side of the capsule move together with the cover of the receptacle which is tilted according to an angle relative to the receptacle. The clamping members comprise linear or curved guiding portions to assist gliding of the capsule in a substantially linear or curved direction. The angle is defined in such a way to make the capsule gliding along the members of the clamp by gravity until it falls into a container located in the vicinity of the receptacle.

The invention also relates to a device for retrieving a capsule in a beverage production apparatus comprising a housing, a cover and a receptacle for receiving said capsule containing a beverage ingredient, the cover and/or the receptacle being moveable between a receptacle closed position and a receptacle opened position, the device is characterized in that it comprises:

- at least one extracting means for extracting and seizing the capsule when inserted in the receptacle, said extracting means being configured to be activated at opening of said receptacle,
- at least one guiding means coupled to the extracting means and configured to be activated after extraction of the capsule and to guide the capsule in gliding on a slope, said slope being defined by an angular position of the cover relative to a horizontal plane;
  - wherein the extracting means comprises a clamp configured to seize the capsule; such clamp also forming said guiding means; said clamp comprising at least two members configured to seize the capsule and forming the slope along which the capsule glides, said members being also preferably configured to enable the opposite member to be moved or spread under the force of a spring from the receptacle opened position to the receptacle closed position.

In particular, the members of said clamp are moved or spread from said one position to the other by engagement of the two members on a surface of the housing and/or receptacle.

As previously mentioned, the members of the clamp are preferably opposite members symmetrically arranged on each side of the cover. They can be joined together on a pair of bearings; each arranged on the cover and linked with at least one spring.

The present invention further concerns a method for retrieving a capsule in a beverage production apparatus by the above described device, the method comprising steps of:
- opening the receptacle by moving the cover or the receptacle,
- activating extracting means by lifting the capsule so that the rim of the capsule is disengaged from the receptacle and clamping the capsule,
- activating guiding means by guiding the extracted capsule in gliding along a slope, said slope being defined by the angular position of the cover relative to a horizontal plane.

More particularly, the invention relates to a method for retrieving a capsule in a beverage production apparatus comprising a cover moveable relatively to a receptacle for receiving said capsule containing beverage ingredient, the cover being hinged to a part of apparatus housing in such a way to tilt the cover according to an angle between a receptacle closed position and a receptacle opened position, the method comprising steps of:
- opening the cover of the receptacle,
- activating a clamp having members arranged on the cover and a spring located between the bottom of the receptacle and the bottom of the capsule,
- lifting the capsule by the spring so that the rim of the capsule is disengaged from the receptacle,
- seizing and extracting the capsule from the receptacle by the members of the clamp moving each against either of sides of the lifted capsule by engaging under the rim of the capsule,
- gliding the extracted capsule by the members of the clamp forming a slope towards a capsule collection space, said slope being defined with an angle which is determined by the angular position of the cover relative to the receptacle in the opened position.

The object is achieved by means of the features of the independent claims. The depending claims develop further the central idea of the present invention.

BRIEF DESCRIPTION OF THE DRAWINGS

The invention will be better understood thanks to the following detailed description which refers to the enclosed drawings given as non limitative examples.

DETAILED DESCRIPTION OF THE INVENTION

Figure 1:
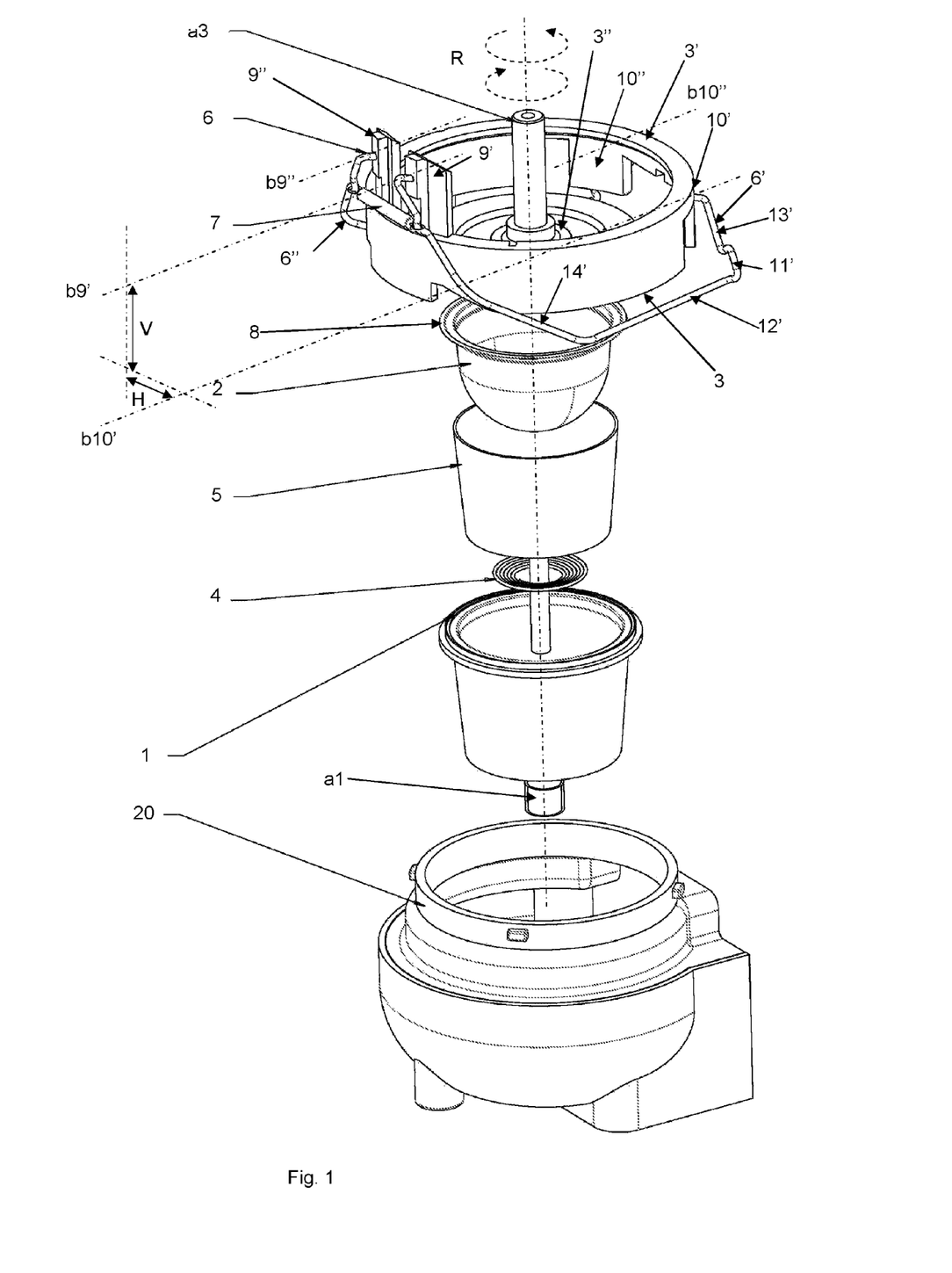
FIG. 1 shows a general view of the device with its components interacting with the receptacle, the capsule and the cover of the receptacle.

The exploded view of FIG. 1 represents different elements of a beverage production apparatus involved by the capsule retrieving device of the invention. The receptacle 1 for receiving a capsule 2 is placed horizontally in a housing 20 of the apparatus so that its opening is directed upwards.

A cover 3 closes the receptacle 1 by mechanical engagement with the housing 20 when the apparatus is operating and opens the receptacle 1 at termination of the beverage production. The opening of the cover 3 leads to extract and retrieve the capsule 2 from the receptacle 1 so that a new capsule may be inserted into the receptacle 1 thus emptied. The opening of the cover 3 may be carried out by a known unlocking mechanism such as a latch activated either by hand or automatically when the apparatus stops after beverage production.

Preferably, the capsule comprises a body containing beverage ingredients such as ground coffee. The body may be closed by an upper wall such as a membrane (removed in FIG. 1). The capsule is provided with a rim 8 arranged on its upper edge directed outwardly to the cover 3. This rim is formed by the assembly of the body of the capsule and by a joint sealing the upper wall or is formed solely by the body.

The extracting means of the capsule retrieving device comprises:
- a clamp 6 provided with preferably two lateral members 6' and 6" each mounted to be joined together on a pair of bearings (9', 10') and (9", 10") each arranged on the cover 3. These members are linked with at least one spring 7 configured to close the clamp by moving together its members 6' and 6" when the cover 3 is opened.
- at least one spring 4 arranged for lifting the capsule upwards and preferably located between the receptacle and the bottom of the capsule. The spring 4 preferably arranged at the center of the bottom of the receptacle 1 is configured to push the capsule 2 upwards when inserted in the receptacle 1 and the cover 3 opened. The spring 4 may have different shapes such as for example a spiral as shown in FIG. 1, or a leg or blade spring or at least two pull springs attached on the upper edge of the receptacle 1.
- optionally, a capsule lift ejector 5 in form of a recipient for receiving the capsule placed in the receptacle on the spring 4 of its bottom. This recipient 5 may be optional. The capsule lift ejector 5 can also be a pusher (instead of the recipient) which is positioned in an offset position relative to the capsule in the receptacle but acting on one or several discrete portions of the rim of the capsule to at least slightly disengage the capsule from the receptacle 1.

The guiding means of the capsule retrieving device comprises:

The members 6' and 6" of the clamp 6 arranged in such a way to form two lateral rails forming a slope when the cover 3 is opened according to a predefined angle. The members 6', 6" are arranged on the cover, dimensioned and distanced from one another to ensure a proper gliding engagement with the rim 8 of the capsule at a certain angle.

Each member 6' and 6" preferably wire shaped have a rectilinear part (12', 12") constituting the rails of the slope. The rectilinear parts (12', 12") may be parallel or slightly inclined one another when configured for guiding the capsule 2. Each end of the rectilinear parts (12', 12") are provided with respectively a front bent part (14', 14"), and a rear bent part (13', 13") linking the rectilinear part (12', 12") to a corresponding front bearing (9', 9") and rear bearing (10", 10") arranged respectively on front and rear side of the cover 3. The rectilinear parts (12', 12") are thus arranged on each lateral side of the cover 3. The angle of the slope is defined by a difference between the length of the front bent part (14', 14") and the rear bent part (13', 13"). In this example, the front bent part (14', 14") is longer than the rear bent part (13', 13").

The rear bent part (13', 13") of each member (6', 6") are provided with an indentation 11' respectively 11" arranged at the end of the slope formed by the rectilinear parts (12', 12"). Theses indentations (11', 11") are shaped and dimensioned to allow passing the rim 8 of the capsule 2 when it leaves the slope.

The axis b9' (b9") of the front bearing (9', 9") is positioned at a vertical distance V and a horizontal distance H relatively to the axis b10' (b10") of the rear bearings (10', 10") in order to allow the rectilinear part (12', 12") to be sufficiently spread aside when the cover 3 closes the receptacle 1, see below the description of FIG. 2.

In case of an apparatus configured for rotating the capsule 2 during brewing operation, the receptacle 1 comprises a rotational axle a1 allowing rotating in the housing 20 which is immobile. A motor preferably integrated in the housing 20 under the receptacle 1 and coupled to the axle a1 ensures the rotation of the capsule 2.

The cover 3 comprises an outer part 3' and an inner part 3" mounted on an axle a3 arranged to rotate relative to the outer part 3' being in a fixed position. When the cover 3 closes the receptacle 1, the axle a3 of the inner part 3" is aligned with the axle a1 of the receptacle 1 allowing rotating together, inside the fixed housing 20, the receptacle 1 closed by the inner part 3" of the cover 3. The direction of the rotation R is either indifferent or may be defined according to the apparatus and/or the capsule design.

In summary, the rotating parts are the receptacle 1 comprising the capsule lifting means made up of the spring 4 and the capsule lift ejector 5, the capsule 2, and the inner part 3" of the cover 3. The remaining parts such as the housing 20, the outer part 3' of the cover 3 comprising the clamp 6 with its bearings (9', 9") (10', 10") and spring 7 are in a non-rotationally moving or static position.

Figure 2:
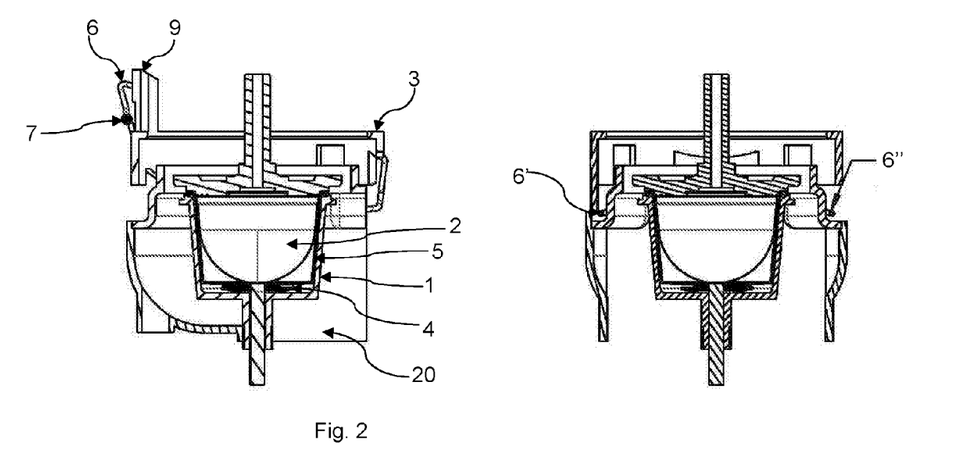
FIG. 2 shows a side and front view of the receptacle containing a capsule in closed and locked position with the members of the clamp of the capsule retrieving device pulled aside and with the capsule pushed down by the cover of the receptacle.

The cross-sectional side and front views of the FIG. 2 illustrates the receptacle 1 containing the capsule 2 in closed position. Generally, the cover 3 is also locked to the housing 20 when the apparatus is in operation for maintaining the capsule in the receptacle in compression against the spring, controlling the release of the centrifuged beverage from the capsule through a flow restriction (such as a valve system at the interface between the capsule and the cover) while resisting to the inside brewing pressure of the coffee or liquid. In this position, the members 6', 6" of the clamp 6 are pulled aside to lay in a zone at each side of the receptacle 1 by leaning on an external part of the housing 20 holding and surrounding the receptacle 1 so that they are entirely disengaged from the rim 8 of the capsule 2. Particularly in apparatuses with centrifugation, this widely spaced position of the members 6', 6" prevents any interference with the capsule 2 in rotation and the beverage when leaving the capsule under the centrifugal forces. In fact, by centrifugation, the beverage flows through the membrane at the top of the capsule, above the rim through a valve arranged on the inner face of the cover, through the space between the external wall of the receptacle 1 and the inner wall of the housing 20 holding the receptacle 1 to finally be collected in a recipient below the receptacle 1 (not shown).

The spring 4 at the bottom of the receptacle is also compressed by the capsule 2 during closure of the cover on the receptacle in its lowest position and to lean the rim 8 against the upper edge of the receptacle 1.

Optionally, the capsule is inserted in a lift ejector 5 formed by a recipient placed in the receptacle 1 by leaning on the spring 4 of the bottom of said receptacle 1. The dimensions of the recipient are adapted to those of the receptacle 1 in order to slide in the receptacle under the force of the spring 4. The recipient is configured to receive the capsule 2 in such a way that the rim 8 around the upper part of the capsule 2 stands out of the recipient upper edge in the closure of the device.

This recipient may be used when capsules of different depth are inserted in the receptacle 1 to ensure a certain compression of the spring 4 whatever the distance between the bottom of the recipient and the bottom of the capsule 2. The lift ejector 5 may be removed when capsules 2 of same depth and corresponding substantially to the depth of the receptacle 1 are used.

In this particular example, the members (6', 6") of the clamp 6 are oriented from the front to the rear of the housing 20 of the apparatus and positioned respectively at the right and left side of the receptacle 1.

Figure 6:
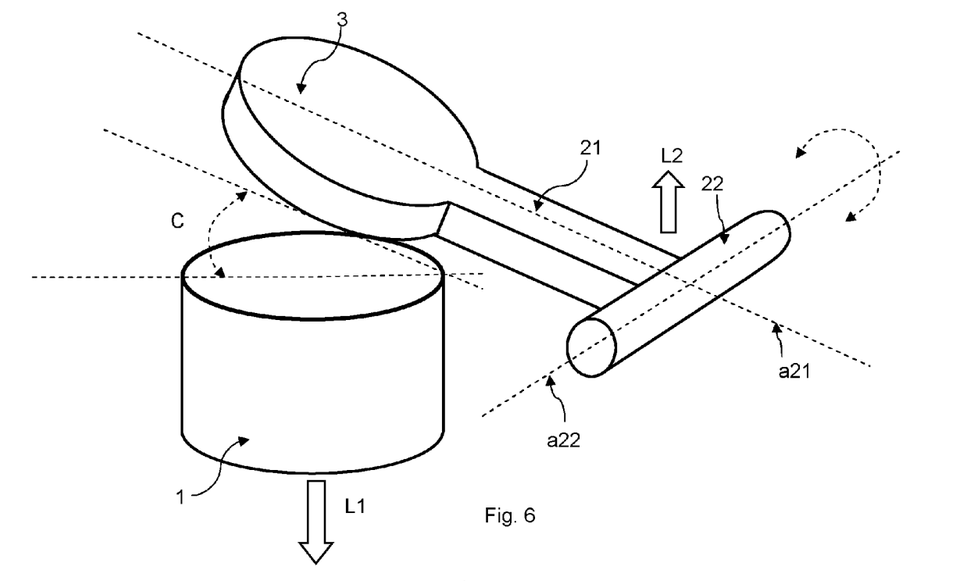
FIG. 6 shows a schematic view of a receptacle which cover is linked by an arm piece to a part of the housing of the beverage production apparatus and hinged according to an axis perpendicular to the axis of the arm piece.

In a first embodiment as schematically illustrated by FIG. 6, the cover 3 is linked to a part of the housing of the apparatus in form of an arm piece 21 which rotates around a hinge 22 attached to the apparatus housing. The axis a22 of the hinge 22 is perpendicular to a longitudinal axis a21 of the arm piece 21 and arranged in such a way that the cover 3 tilts according to an angle C between the receptacle 1 closed position and the receptacle 1 opened position. The length of the arm piece 21 depends on the apparatus design and on the space needed for collecting used capsules.

Figure 7:
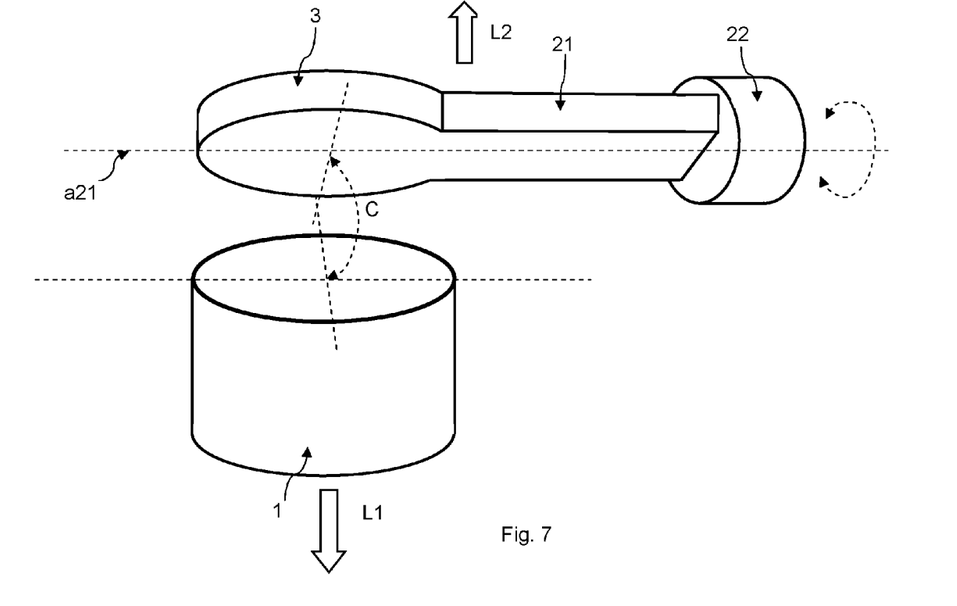
FIG. 7 shows a schematic view of a receptacle which cover is linked by an arm piece to a part of the housing of the beverage production apparatus and hinged according to a longitudinal axis of the arm piece.

In a second embodiment as schematically illustrated by FIG. 7, the hinge 22 is in line with the arm piece 21 which rotates around its longitudinal axis a21 to tilt the cover 3 according to the angle C between the receptacle 1 closed position and the receptacle 1 opened position. As in the first embodiment, the length of the arm piece 21 depends also on the apparatus design and may furthermore be reduced to the minimum length in case the hinge is positioned very near to the receptacle 1.

In both above embodiments the angular motion of the cover between the closed and the opened positions may be completed by a linear motion either of the receptacle (arrow L1) or the axis of the hinge (arrow L2) in order to open a sufficient space between the cover and the receptacle for passing the capsule gliding towards the collection space. For example the receptacle 1 may move downwards when the cover reaches the angle C at opening. In another configuration of the apparatus, the hinge 22 together with the arm piece 21 and the cover 3 may move upwards when the cover 3 is opened according to the angle C while the receptacle 1 remains in its position. These two linear motions L1 and L2 of the receptacle 1 and of the cover 3 may also be combined in a further configuration of the apparatus.

In the examples of FIGS. 2 to 5, the cover 3 moves according to the first embodiment by opening from the front around a hinge placed behind the receptacle 1 perpendicularly to members (6', 6") of the clamp 6.

Figure 3:
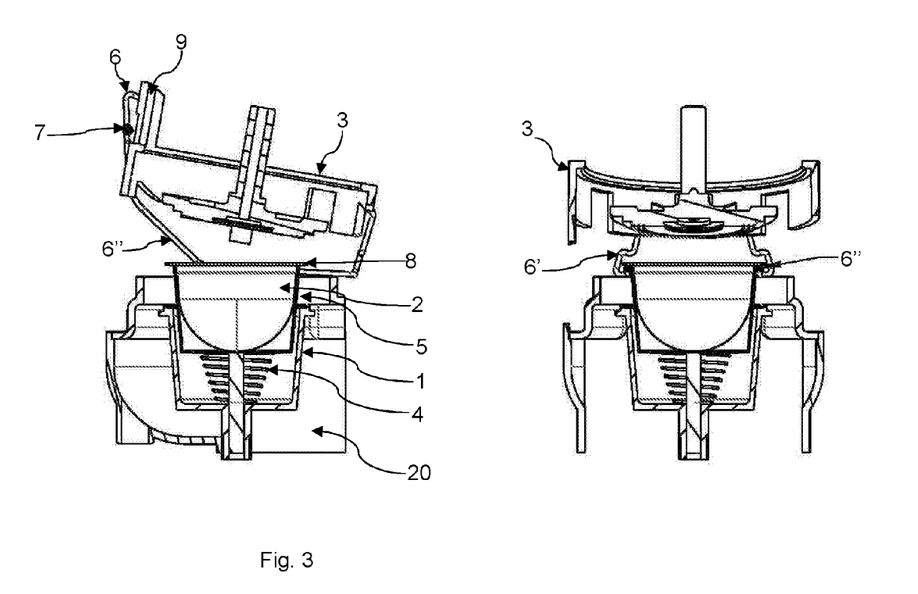
FIG. 3 shows a side and front view of the receptacle containing capsule at extraction phase where at opening of the cover of the receptacle, the members of the clamp move under the rim of the capsule.

FIG. 3 shows the activation of the capsule retrieving device when the cover 3 begins to open. The spring 4 is released and pushes upwards the capsule 2, respectively the capsule lift ejector 5 containing the capsule 2 in order to disengage the rim 8 from the edge of the receptacle 1. At the same time the members (6', 6") of the clamp 6 move upwards and inwards against the lifted capsule 2 until they reach their final position under the rim 8 at each side of the capsule 2. This motion is activated by the spring 7 which passes from an extended state when the cover 3 is closed to a released state when the cover 3 opens. The clamp 6 and the spring 7 are dimensioned and provided with abutments (not shown) in such a way to hold the capsule 2 by the rim 8 without gripping the capsule 2 which has to glide afterwards along the members (6', 6") of the clamp 6 or more precisely along the rectilinear parts (12', 12") of the members (6', 6"). Of course, the spring 7 can take various forms provided the elastic urging function on the lateral members 6', 6" is achieved. For instance, the spring may be integral to the members 6', 6".

Figure 4:
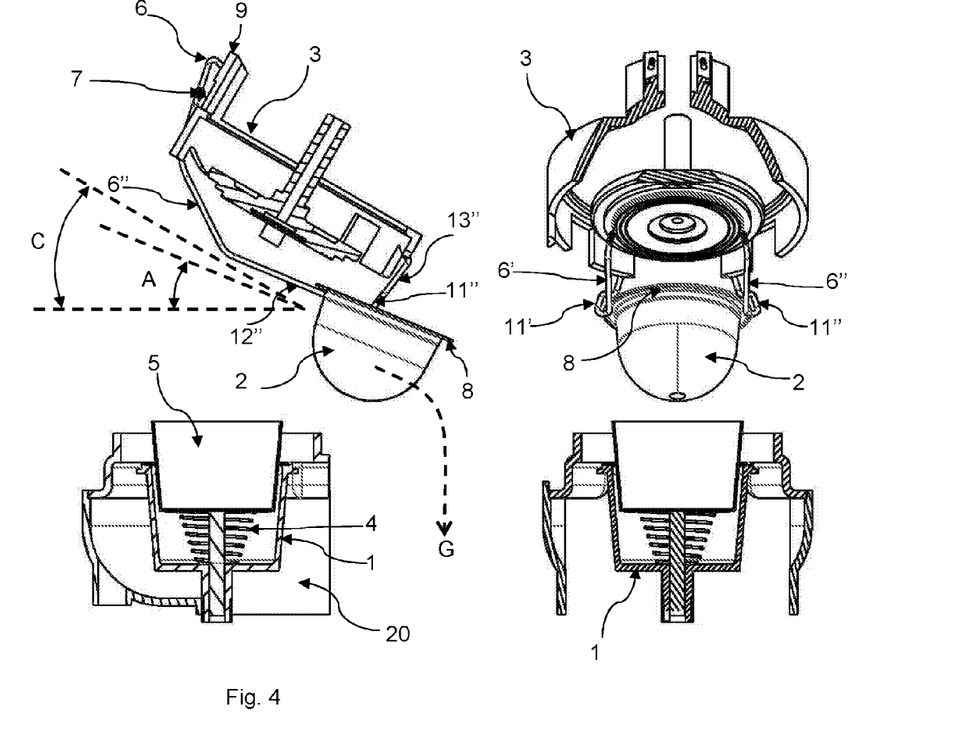
FIG. 4 shows a side and front view of the receptacle containing capsule at dumping phase where the capsule is extracted from the receptacle and taken by the members of the clamp whereon it glides towards a collection container.

The capsule 2 is thus seized by the members (6', 6") of the clamp and extracted from the receptacle, respectively from the lift ejector 5 when the cover opens until a predefined angular position of the rectilinear parts (12', 12") of the members (6', 6") i.e. angle A as shown by FIG. 4.

As the clamp 6 is coupled with the cover 3, the rectilinear parts (12', 12") of the members (6', 6") are tilted according to an angle A close to the opening angle C of the cover 3. They form two substantially parallel rails able to make the capsule 2 glide according to a slope having the angle A relative to a horizontal plane parallel to the receptacle 1. The slope directs the capsule 2 to fall by gravity G into a capsule collection space which preferably consists of a bin (not illustrated) located behind the receptacle 1. The indentations 11', 11" on the members 6' and 6" prevent the rim 8 hitting the rear bent parts (13', 13") of the members 6', 6" attached to the cover 3 when the capsule 2 leaves the slope at receptacle opened position to fall into the collection space.

The value of the angle A relative to horizontal is determined in such a way to make glide a capsule of any depth and weight which can be inserted properly into the receptacle 1 with or without capsule lift ejector 5. The angle A may be comprised between 5 and 90 degrees relative to horizontal most preferably between 10 and 75 degrees relative to horizontal. The minimum angular value is defined to be sufficient to lift the capsule 2 out of the receptacle 1 while the maximum angular value is defined to be sufficient to make the capsule 2 glide on the members 6', 6" of the clamp.

Figure 5:
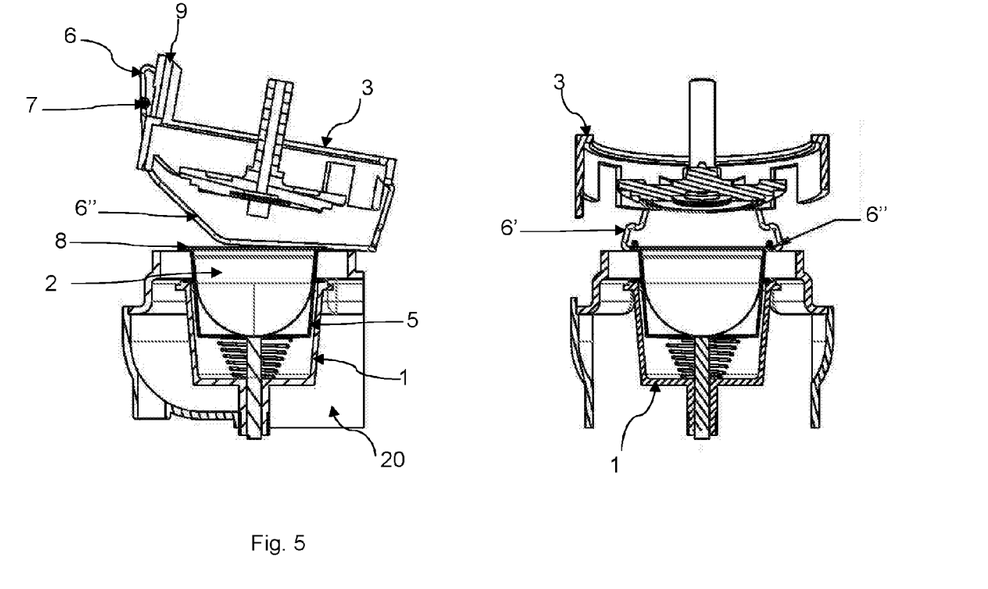
FIG. 5 shows a side and front view of the receptacle containing capsule at closing phase where the members of the clamp are moved aside over the capsule which is pushed down by the clamp until the cover of the receptacle is locked.

FIG. 5 illustrates the closing phase of the cover 3 after a new capsule has been inserted into the receptacle 1. The members (6', 6") of the clamp 6 which were turned down by the previous capsule retrieval, push the new capsule downwards inside the receptacle 1 and in the same time they are progressively pushed aside over the capsule 2 first by contact with the top of the capsule and then with the housing of the receptacle 1. The spring (s) 7 linking the members (6', 6") extends allowing the members (6', 6") to take place at the same final position at each side of the receptacle as in the FIG. 2 showing the closed receptacle.

The spring 4 at the bottom of the receptacle is compressed at the same time the members (6', 6") of the clamp 6 are pushed aside. The rim 8 of the capsule 2 leans again on the upper edge of the receptacle 1. Finally the cover 3 is preferably locked to the housing 20.

Figure 8:
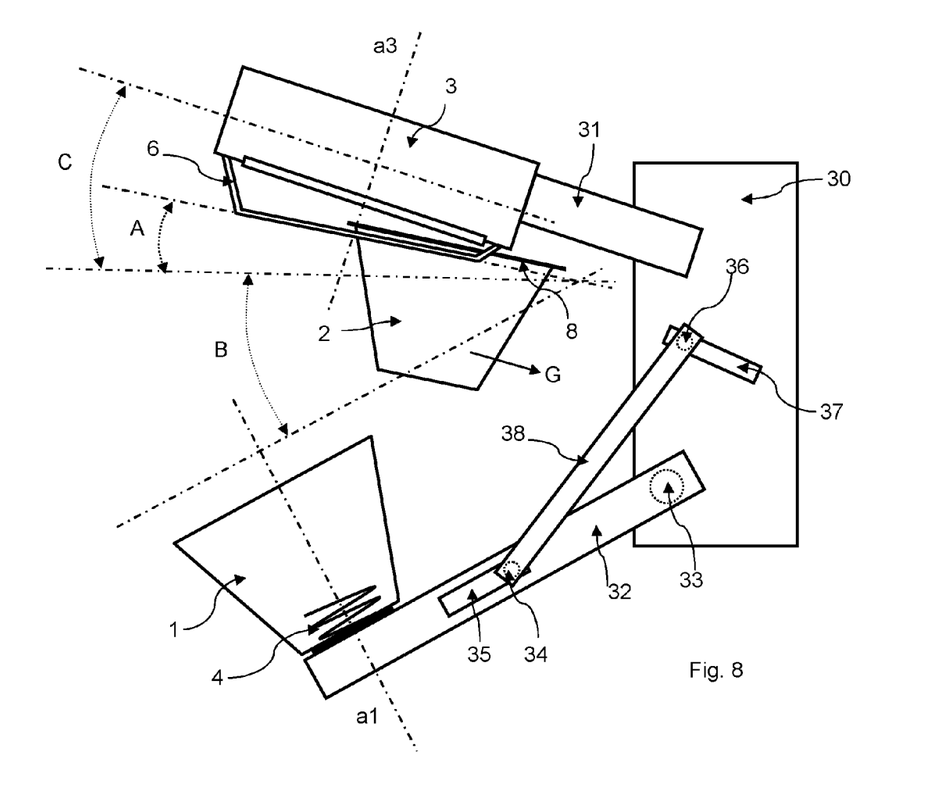
FIG. 8 shows a schematic view of an embodiment where the receptacle moves relatively to a fixed cover to let the capsule gliding on a slope formed by the members of the clamp.
Figure 9:
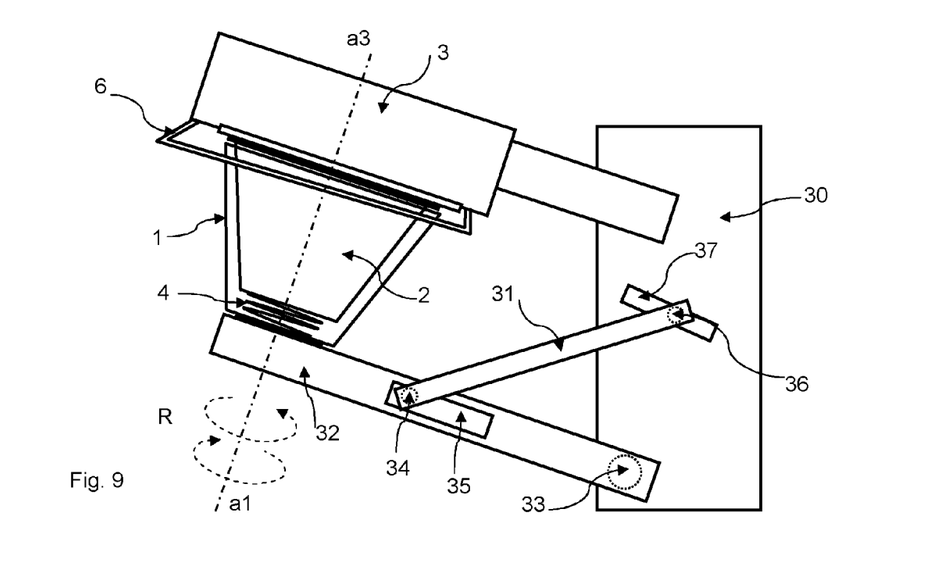
FIG. 9 shows a schematic view of the embodiment of FIG. 8 where the receptacle is in closed position with the capsule inserted in the receptacle.

The FIGS. 8 and 9 illustrate a further possible embodiment where the cover 3 is in a fixed tilted position while the receptacle 1 moves down relatively to the cover 3. This embodiment may also be applied to an apparatus configured for rotating the capsule 2.

The cover 3 is attached with an arm piece 31 to a part of the housing such as a support 30 integral with the housing of the apparatus (not shown) in an angular position relative to a horizontal plane according to an angle C. As shown in FIG. 8, the receptacle 1 opens by rocking down according to an angle B relative to the horizontal plane thanks to an arm piece 32 hinged to the support 30. In a particular mechanical configuration example, the receptacle open position is determined with abutments provided by a rod 38 hinged around axles 34 and 36 at each end of the rod 38 by sliding in corresponding slots 35 and 36 respectively on the arm piece 32 and on the support 30. An axle 33 at the hinged end of the arm piece 32 attached to the support 30 and coupled to a motor ensures the open and closing motion of the receptacle 1 which is mounted on the other end of the arm piece 32.

At opening of the receptacle 1, the members (6', 6") of the clamp 6 extract the capsule 2 lifted by the spring 4 at the bottom of the receptacle 1 and seize it by the rim 8 as in the preceding embodiment. The capsule 2 is then positioned to glide on the members (6', 6") which form a slope having an angle A defined by the geometry of the members (6', 6") and the angle C of the cover 3. The value of the angle A is in the same range than the one of the preceding embodiment. The angle B between the horizontal plane and the arm piece 32 carrying the receptacle 1 at opened position is determined according to the size of the capsule and the space needed by the same to glide freely (arrow G) on the members (6', 6") towards a collection space. Furthermore, the receptacle open angular position is also defined to make easier the insertion of a capsule into the receptacle 1 by a sufficient separation between the top of the receptacle 1 and the members (6', 6") of the clamp 6.

In the closed position as shown by FIG. 9, the receptacle 1 containing the capsule 2 leans against the fixed cover 3. The members 6', 6" of the clamp 6 are pulled aside to be positioned at each side of the receptacle 1 and the spring 4 at the bottom of the receptacle is compressed by the capsule 2. As in the preceding embodiment, the capsule 2 may also be inserted in a lift ejector placed in the receptacle 1 by leaning on the spring 4 of the bottom of said receptacle 1.

In the case of a centrifugation apparatus, the cover 3 is provided with a rotary inner piece which axis a3 is aligned with the axis a1 of the recipient 1. The receptacle 1 thus rotates around an axle coupled to a motor preferably housed in the arm piece 32 under the receptacle 1.

In a further embodiment both of the cover 3 and the receptacle 1 may be moved from the receptacle closed position to the receptacle open position i.e. in a combination of the movements according to FIGS. 2 to 7 and according to FIGS. 8 and 9. When the receptacle opens, the capsule 2 is extracted and glides along the members 6', 6" of the clamp 6 until it falls into the collection space.

The invention claimed is:

1. A beverage production apparatus comprising:
   a housing, a cover, and a receptacle for receiving a capsule containing a beverage ingredient, wherein the cover and/or the receptacle is moveable between a receptacle closed position and a receptacle opened position; and
   a device for retrieving the capsule, the device comprising:
   at least one extracting member for extracting and seizing the capsule when inserted in the receptacle, the at least one extracting member being configured to be activated at opening of the receptacle; and
   at least one guiding member coupled to the at least one extracting member and configured to be activated after extraction of the capsule and to guide the capsule in gliding on a slope, the slope being defined by an angular position of the cover relative to a horizontal plane,
   the at least one extracting member comprises a clamp configured to seize the capsule by engaging under a rim arranged around an upper edge of the capsule, the at least one guiding member is formed by two opposite members of the clamp that guide the capsule along the slope, the two opposite members of the clamp are each joined together on a pair of bearings, each arranged on the cover and linked with at least one spring configured to move the two opposite members against both sides of the capsule at opening of the cover.

2. The beverage production apparatus of claim 1, wherein the cover is moveable relative to the receptacle in the opened position to ensure that the slope defined by the at least one guiding member forms a non-horizontal angle.

3. The beverage production apparatus of claim 1, wherein the cover is hinged to a part of the housing to tilt relative to the receptacle when moving from the receptacle closed position to the receptacle opened position.

4. The beverage production apparatus of claim 1, wherein the receptacle is movable relative to the cover in the receptacle opened position, the cover being in a fixed tilted position to ensure that the slope defined by the at least one guiding member forms a non-horizontal angle.

5. The beverage production apparatus of claim 4, wherein the receptacle is mounted on an end of an arm piece, and the other end of the arm piece is hinged to a part of the housing to tilt relative to the cover in moving from the receptacle closed position to the receptacle opened position.

6. The beverage production apparatus of claim 1, wherein the at least one spring is located between a bottom of the receptacle and a bottom of the capsule, the at least one spring being configured to release at opening of the cover and to lift the capsule upwards.

7. The beverage production apparatus of claim 1, wherein the two opposite members are arranged symmetrically on each side of the cover.

8. The beverage production apparatus of claim 7, wherein the two opposite members of the clamp form two parallel rails able to glide the capsule in the receptacle opened position, the rails being tilted according to an angle to direct the capsule that falls by gravity into a capsule collection space formed by a bin.

9. The beverage production apparatus of claim 1, wherein the at least one extracting member further comprises a capsule lift ejector formed by a recipient or a pusher.

10. The beverage production apparatus of claim 9, wherein the capsule lift ejector is the recipient configured to receive the capsule such that the rim around the upper edge of the capsule extends out of an upper edge of the recipient, the recipient being placed in the receptacle by leaning on the at least one spring, and the at least one spring is on a bottom of the receptacle.

11. A beverage production apparatus comprising:
    a housing, a cover, and a receptacle for receiving a capsule containing a beverage ingredient, wherein the cover and/or the receptacle is moveable between a receptacle closed position and a receptacle opened position; and
    a device for retrieving the capsule, the device comprising:
    at least one extracting member for extracting and seizing the capsule when inserted in the receptacle, the at least one extracting member configured to be activated at opening of the receptacle; and
    at least one guiding member coupled to the at least one extracting member and configured to be activated after extraction of the capsule and to guide the capsule in gliding on a slope, the slope defined by an angular position of the cover relative to a horizontal plane,
    the at least one extracting member comprises a clamp configured to seize the capsule by engaging under a rim arranged around an upper edge of the capsule, the at least one guiding member is formed by two opposite members of the clamp for guiding the capsule along the slope, wherein, at the receptacle closed position, the two opposite members of the clamp are pulled aside to lay in a zone at each side of the receptacle by leaning on an external part of the housing, the two opposite members being entirely disengaged from the rim of the capsule.

12. A method for retrieving a capsule in a beverage production apparatus, the method comprising:
    opening a receptacle by moving a cover or the receptacle;
    activating a clamp comprising two opposite members by lifting the capsule so that a rim arranged around an upper edge of the capsule is disengaged from the receptacle and seizing the capsule by the two opposite members engaging the capsule under the rim;
    activating the two opposite members of the clamp to guide the capsule in a gliding along a slope, the slope being defined by an angular position of the cover relative to a horizontal plane, the two opposite members of the clamp are each joined together on a pair of bearings, each arranged on the cover, and linked with at least one spring; and
    moving, by the at least one spring, the two opposite members against both sides of the capsule at opening of the cover.

13. A method for retrieving a capsule in a beverage production apparatus, the method comprising:
    opening a receptacle by moving a cover or the receptacle;
    activating a clamp comprising two opposite members by lifting the capsule so that a rim arranged around an upper edge of the capsule is disengaged from the receptacle and seizing the capsule by the two opposite members engaging the capsule under the rim;
    activating the two opposite members of the clamp to guide the capsule in a gliding along a slope, the slope being defined by an angular position of the cover relative to a horizontal plane;
    pulling aside the two opposite members of the clamp at a receptacle closed position so that the two opposite members lay in a zone at each side of the receptacle by leaning on an external part of a housing of the beverage production apparatus; and entirely disengaging the two opposite members from the rim of the capsule.

14. A system comprising:
(a) a capsule containing a beverage ingredient and comprising a rim arranged around an upper edge of the capsule;
(b) a beverage production apparatus comprising a housing, a cover and a receptacle for receiving the capsule containing the beverage ingredient, wherein the cover and/or the receptacle is moveable between a receptacle closed position and a receptacle opened position; and
(c) a clamp comprising two opposite members configured to extract and seize the capsule when inserted in the receptacle, the clamp configured to be activated at opening of the receptacle, the two opposite members seize the capsule by engaging the capsule under the rim arranged around an upper edge of the capsule, the two opposite members of the clamp configured to be activated after extraction of the capsule to guide the capsule in gliding on a slope, the slope being defined by an angular position of the cover relative to a horizontal plane, the clamp has a configuration selected from the group consisting of (i) the two opposite members of the clamp are each joined together on a pair of bearings, each arranged on the cover and linked with at least one spring configured to move the two opposite members against both sides of the capsule at opening of the cover, (ii) the two opposite members of the clamp are pulled aside at the receptacle closed position to lay in a zone at each side of the receptacle by leaning on an external part of the housing, the two opposite members being entirely disengaged from the rim of the capsule, and (iii) a combination thereof.

* * * * *